United States Patent [19]

Campbell

[11] 4,188,569
[45] Feb. 12, 1980

[54] CONTROL CIRCUIT FOR AN ELECTRIC VEHICLE TRACTION MOTOR

[75] Inventor: Graeme R. Campbell, Tettenhall, England

[73] Assignee: Lucas Industries Limited, Birmingham, England

[21] Appl. No.: 861,041

[22] Filed: Dec. 15, 1977

[30] Foreign Application Priority Data

Dec. 24, 1976 [GB] United Kingdom ............... 54179/76

[51] Int. Cl.² .......................................... H02P 3/12
[52] U.S. Cl. .................................. 318/375; 318/379; 318/139
[58] Field of Search .................. 318/60, 87, 139, 375, 318/379–381

[56] References Cited

U.S. PATENT DOCUMENTS

| | | | |
|---|---|---|---|
| 3,989,990 | 2/1976 | Thompson | 318/139 |
| 4,008,423 | 2/1977 | Christianson et al. | 318/139 |
| 4,066,939 | 1/1978 | Joyes | 318/139 |

Primary Examiner—Gene Z. Rubinson
Assistant Examiner—M. K. Mutter
Attorney, Agent, or Firm—Ladas, Parry, Von Gehr, Goldsmith & Deschamps

[57] ABSTRACT

A control circuit for an electric vehicle traction motor having separate armature and field windings, includes an armature winding current control, a braking contact which is in series with the armature winding and which is closed or opened in accordance with whether motoring or braking is required, an alternative path being provided for motor current during braking, reversing switch means connected in circuit with the field winding, a field current control and logic circuit means arranged to operate during a change for braking mode to motoring mode so as sequentially to reverse said reversing switch means when the field current is below a predetermined level, commence field current flow in the required direction for motoring and then close the brake contact whereby any residual magnetism in the field structure is reversed before the brake contact is closed.

3 Claims, 11 Drawing Figures

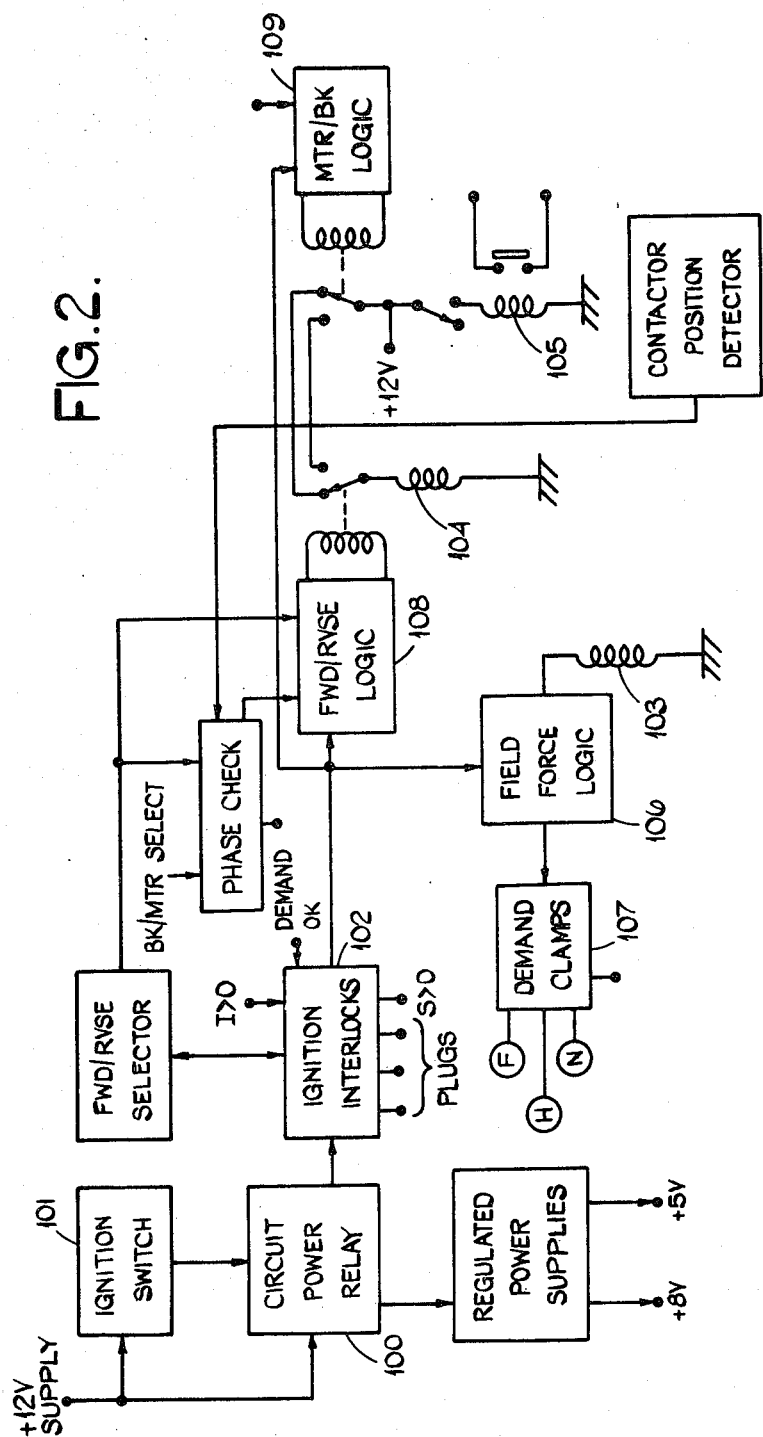

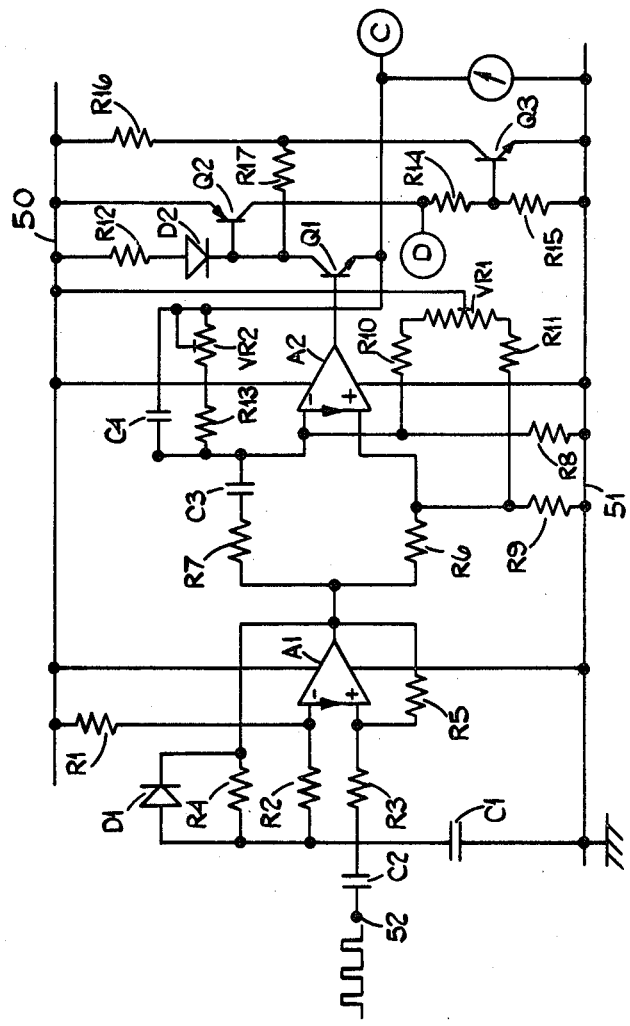
FIG. 3. SPEED TRANSDUCER INTERFACE

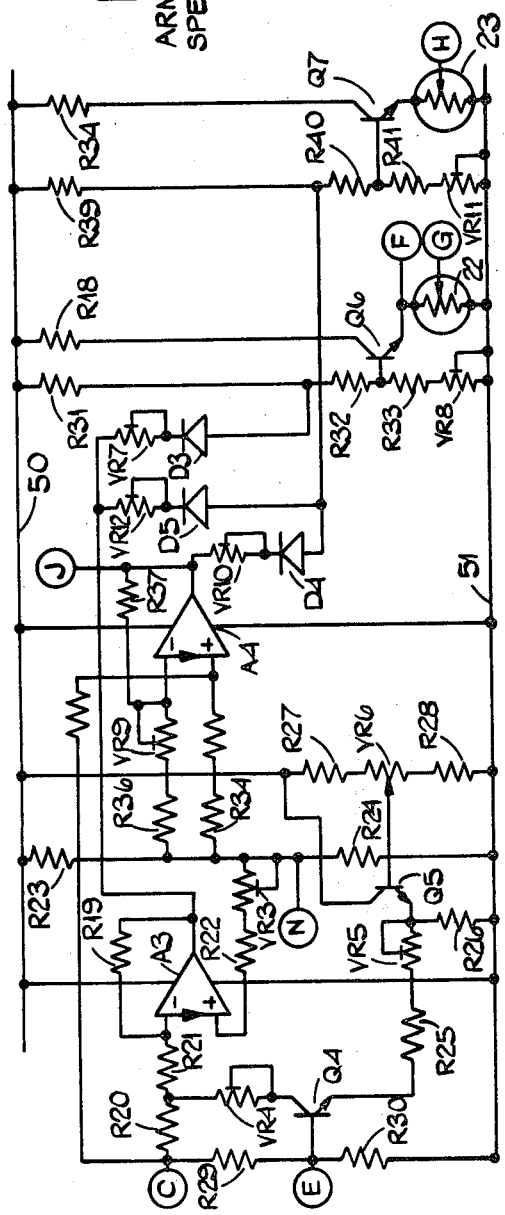
FIG. 4. ARMATURE DEMAND SPEED SHAPING
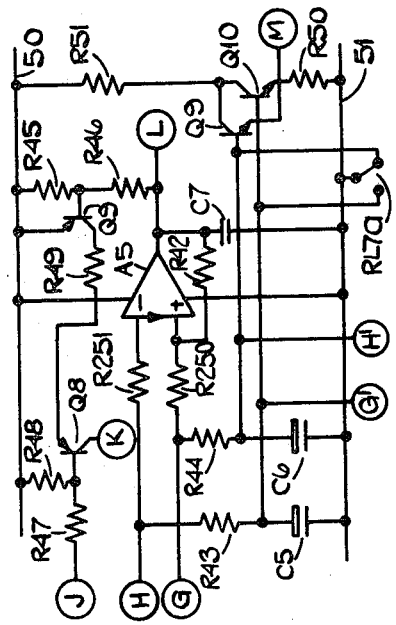
FIG. 5. MTR/BK COMPARATOR

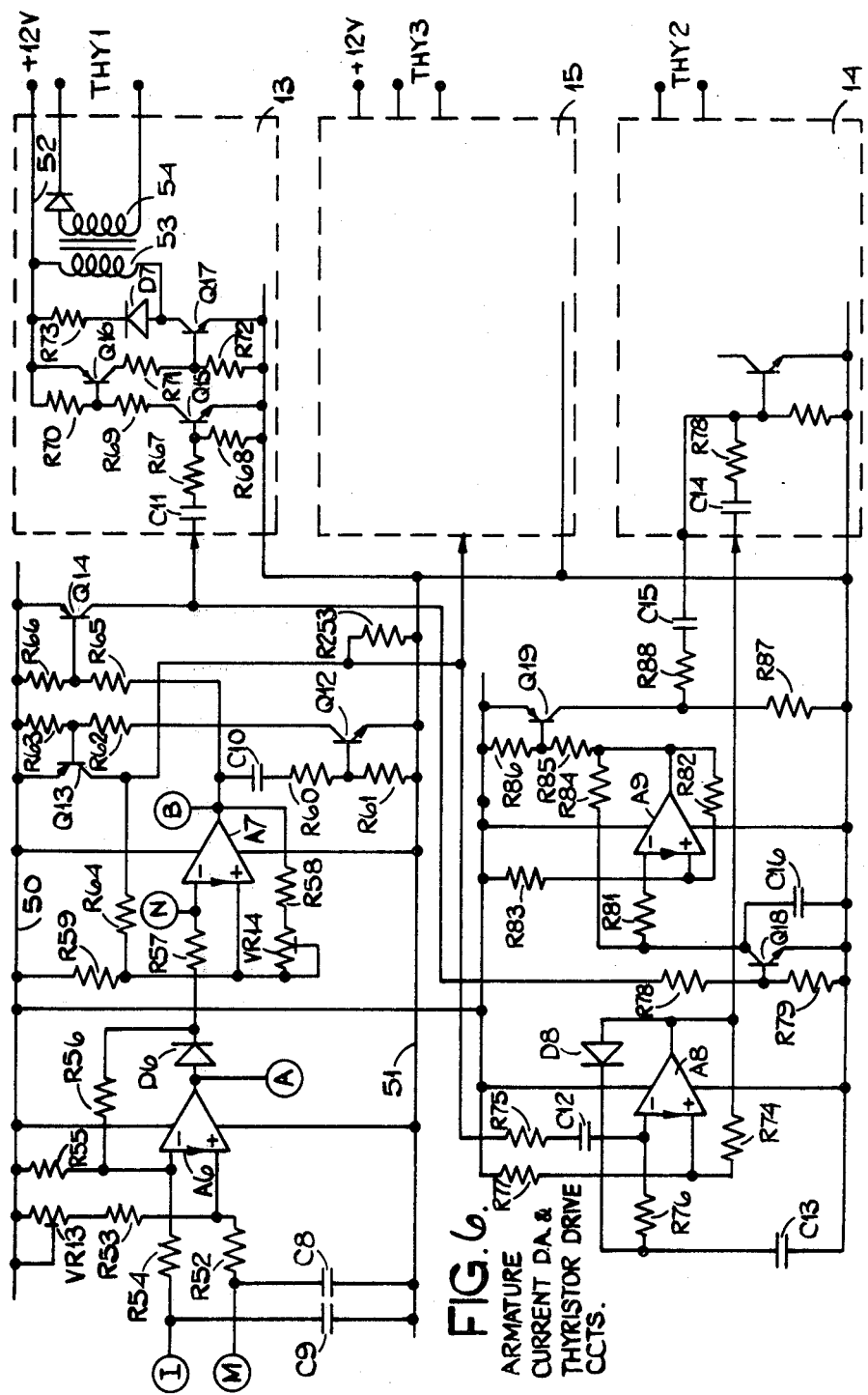
FIG. 6. ARMATURE CURRENT D.A. & THYRISTOR DRIVE CCTS.

ARMATURE CHOPPER

FIELD CURRENT CONTROL CCT.

FIELD CURRENT CHOPPER CCT

FIG.10. IGNITION, POWER RELAY, INTERLOCKS & FWD/RVSE SELECTOR.

CONTROL CIRCUIT FOR AN ELECTRIC VEHICLE TRACTION MOTOR

This invention relates to a control circuit for an electric vehicle traction motor of the general kind having independent current controls for the armature and the field winding of the motor.

A control circuit in accordance with the invention comprises an armature winding current control, a braking contact which is in series with the armature winding and which is closed or opened according to whether motoring or braking is required, an alternative path being provided for current generated by the motor during braking, reversing switch means connected in circuit with the field winding, a field current control and logic circuit means arranged to operate during a change from braking mode to motoring mode so as sequentially to reverse said reversing switch means when the field current is below a predetermined level, commence field current flow in the required direction for motoring mode and then close the brake contact whereby any residual magnetism in the field structure is reversed before the brake contact is closed.

It will be appreciated that, although an armature current interlock may be provided to prevent brake contact operation when current is flowing, such an interlock will be sensitive to the current which can result from residual magnetism. Indeed the interlock will permanently prevent changeover where residual magnetism exists. The making and breaking of such current repeatedly may, however, eventually damage the contact and the invention ensures that such damage is avoided, and smooth change from braking to motoring is ensured.

In the accompanying drawings:

FIG. 2 is a block diagram of the remainder of the circuit of FIG. 1;

FIGS. 3 to 9 show portions of FIG. 1 in more detail and

Figure 1:
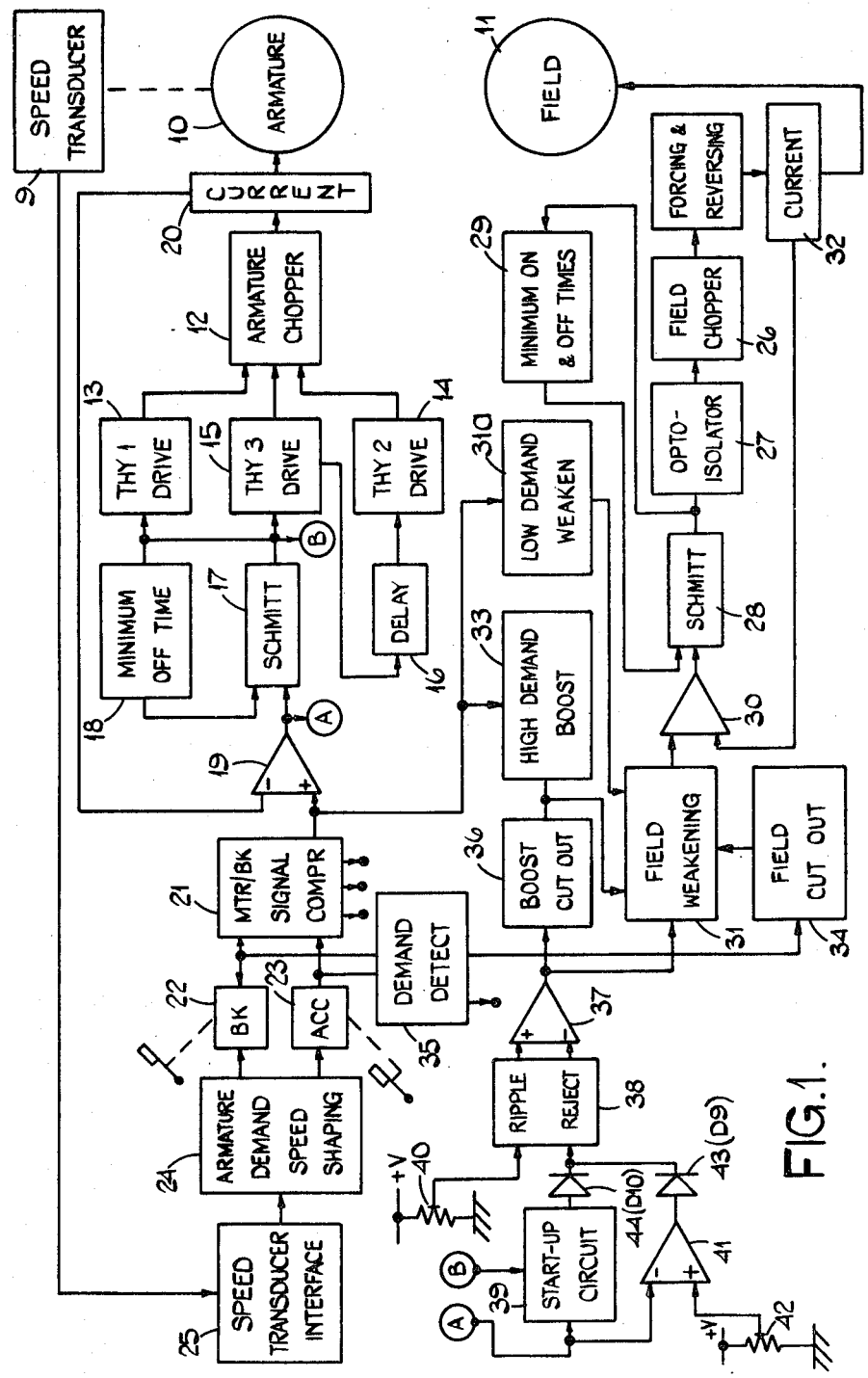
FIG. 1 is a block diagram of one part of an example of a control circuit in accordance with the invention.

Dealing firstly with FIG. 1 the control circuit includes interlinked controls for the armature current and field current of a traction motor having a separate armature 10 and field winding 11. The armature 10 is energised from a high voltage battery by a chopper circuit 12 (shown in detail in FIG. 7). The chopper circuit 12 is controlled in turn by three thyristor circuits 13, 14, 15, the circuit 14 being arranged to operate after a fixed delay (set by a circuit 16) after the circuit 15. The circuits 13, 14, 15 are controlled by a trigger circuit 17 which has a minimum off-time generator circuit 18 associated with it. The trigger circuit 17 in turn is fed with a current error signal from an armature current difference amplifier 19 which compares a current demand signal with a signal derived from an armature current transducer 20. The circuits 13 to 19 inclusive are shown in detail in FIG. 6.

The current demand signal fed to the difference amplifier 19 is derived by a motor/brake comparator 21 (FIG. 5) which receives input signals from two foot pedal operated potentiometers 22, 23 to which speed dependent signals are fed by a demand speed shaping circuit 24 (see FIG. 4). The circuit 24 receives its input from a speed transducer interface circuit 25 receiving a frequency signal from a speed transducer 9 driven by the motor and providing a signal voltage proportional to speed (see FIG. 3).

Figure 8:
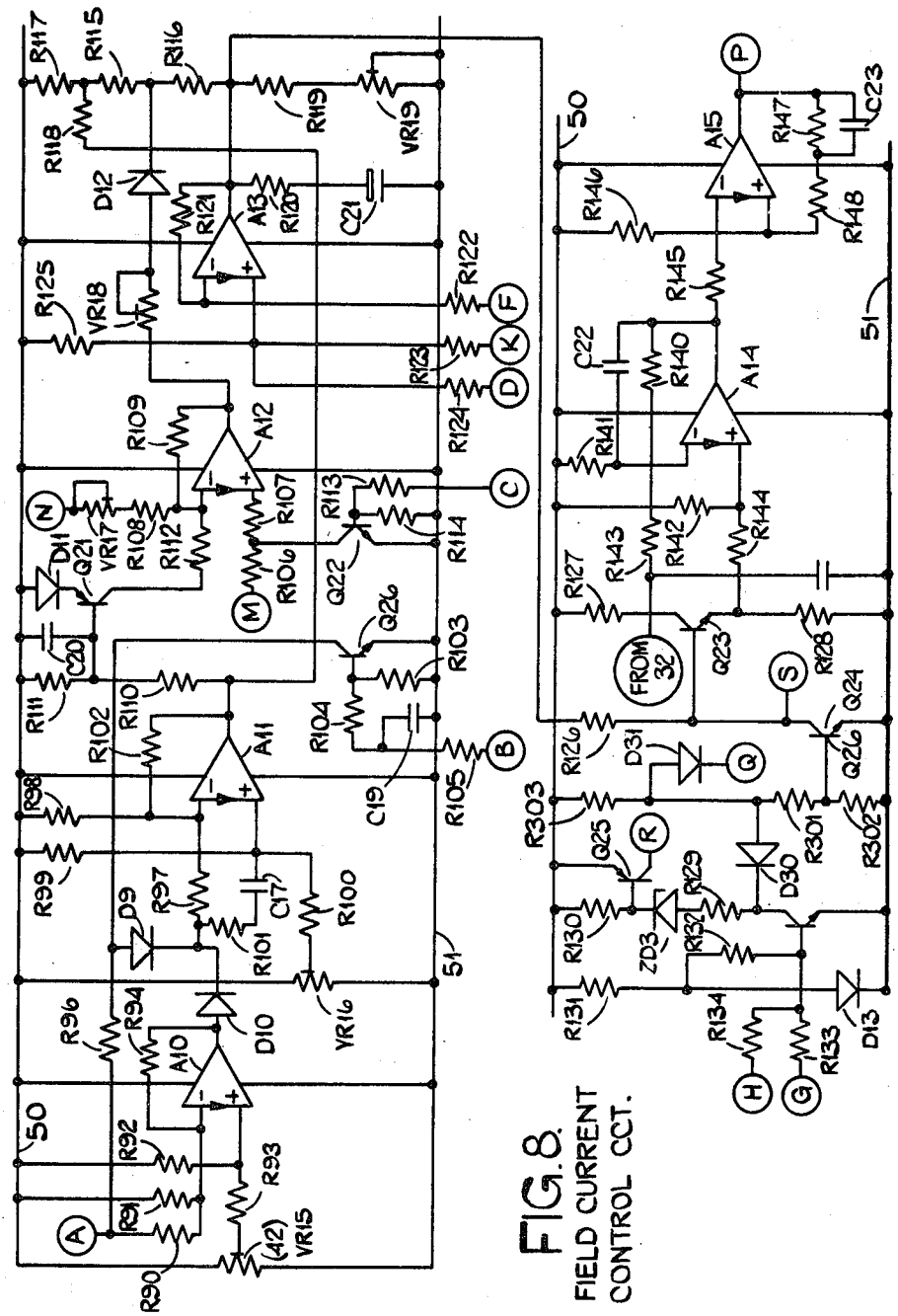

The field current is controlled by a field chopper circuit 26 (FIG. 9) controlled through an opto-isolator 27 (FIG. 9) from a trigger circuit 28 (FIG. 8) with which there is associated a minimum on time and minimum off time generating circuit 29 (FIG. 8). A field current difference amplifier 30 (FIG. 8) supplies the trigger circuit 28 with its input signal, receiving input signals from a field current demand control circuit constituted by field weakening circuit 31 and from an field current transducer 32. Associated with the circuit 31 is a circuit 31a for decreasing the field current damand signal at low armature current demand, and a boost circuit 33 for boosting the field current demand signal at high armature current damand. Circuits 31a and 33 are controlled by the output of the comparator circuit 21. A field cutout circuit 34 controlled by an armature demand detector 35 (from the potentiometers 22, 23) controls the circuit 31 to remove the field current demand when there is no armature current damand. A boost cut out circuit 36 is connected to override the boost circuit 33 under the control of a difference amplifier 37 which also provides an input to the circuit 31. The difference amplifier 37 receives inputs via a ripple rejection circuit 38 from a preset reference voltage 40 via a start up circuit 39 from the output of the armature current difference amplifier 19. A brake field weakening difference amplifier 41 compares the output of the amplifier 19 with a different fixed reference voltage 42 and the output of the amplifier 41 is combined via diodes 43, 44 with that of the start up circuit so that the larger signal at any time is actually fed to the amplifier 37 via the ripple rejection circuit.

Turning now to FIG. 3, the speed transducer interface includes an operational amplifier A1 with its power terminals connected between a positive supply rail 50 and an earth rail 51. The inverting input terminal of the amplifier A1 is connected via a resistor R1 to the rail 50 and via a resistor R2 and a capacitor C1 in series to the rail 51. The non-inverting input terminal of the amplifier A1 is connected by a resistor R3 and a capacitor C2 to the output terminal 52 of the speed transducer 9. Negative feedback is provided by a resistor R4 and a diode D1 in parallel between the output terminal of the amplifier A1 to the junction of the resistor R2 and the capacitor C1 and positive feedback is provided by a resistor R5 connected between the output terminal and the non-inverting input terminal of the amplifier A1.

The output terminal of the amplifier A1 is connected by a resistor R6 to the non-inverting input terminal of an operational amplifier A2 and by a resistor R7 and capacitor C3 in series to the inverting input terminal that amplifier. These inverting and non-inverting input terminals are connected by resistors R8, R9 respectively to the rail 51 and are connected together by a series circuit of a variable resistor VR1 and two padding resistors R10, R11, the variable point of the resistor VR1 being connected to the rail 50. The output terminal of the amplifier A2 is connected to the base of an n-p-n transistor Q1 with its collector connected via a resistor R12 and a diode D2 in series to the rail 50. The emitter of the transistor Q1 is connected to a terminal C and also, by a variable resistor VR2 and resistor R13 in series to the inverting input terminal of the amplifier A2. A capacitor C4 is connected across the resistors R13 and VR2 to provide smoothing of the pulse train applied to the amplifier A2 by the amplifier A1. The amplifier A1 and its associated components forms a monostable, which responds to a positive going edge via R3, C2, by producing a fixed width pulse at the output. The output waveform is thus a train a constant width pulses, the average value of which is porportional to the number of pulses at the input 52, and to vehicle speed. The amplifier A2 forms an integrator and averages the wave form at the output of A1. Q1 is an emitter follower, which provides a low impedance output, so that the voltage at terminal C is directly proportional to the frequency of the pulses from the transducer 21, (i.e. to the motor speed).

The circuit of FIG. 3, also includes a switch circuit constituted by two complementary transistors Q2 and Q3 and associated resistors to provide an output to a terminal D (to FIG. 10) when the motor is not stationary. The p-n-p transistor Q2 has its base connected to the collector of the transistor Q1, its emitter connected to the rail 50 and its collector connected by two resistors R14, R15 in series to the rail 51. The n-p-n transistor Q3 has its base connected to the common point of resistors R14, R15, its emitter connected to the rail 51 and its collector connected by a load resistor R16 to the rail 50. A feedback resistor R17 is connected between the collector of the transistor Q3 and the base of the transistor Q2. Whenever the output of the amplifier A2 rises above its off level, which occurs whenever pulses are being received from the transducer 9, the transistor Q1 starts turning on. The diode D2 biases the transistor Q2 to the verge of conduction so that any current in resistor R12 as transistor Q1 turns on turns transistor Q2 on. This in turn turns transistor Q3 on and the resistor R17 provides positive feedback to switch transistor Q2 hard on. Thus the signal at terminal D (at the collector of transistor Q2) goes high whenever the motor is not stationary.

Turning now to FIG. 4 the armature demand speed shaping circuit includes two operational amplifiers A3, A4 for controlling the signals applied to the motoring and braking potentiometers 22, 23 respectively. The terminal C is connected via two resistors R20, R21 in series to the inverting input terminal of the amplifier A3 which has a negative feedback resistor R19, the non-inverting input terminal of amplifier $A_3$ connected by a resistor R22 and a variable resistor VR3 in series to the common point of a series resistor chain R23, R24 connected between the rails 50, 51. The common point of the resistors R20, R21 is connected by a variable resistor VR4 to the collector of an n-p-n transistor Q4 the emitter of which is connected by a resistor R25 and a variable resistor VR5 in series to the emitter of an n-p-n transistor Q5 with its emitter connected to the rail 51 by a resistor R26. The collector of the transistor Q5 is connected to the rail 50 and its base is connected to the variable point of a variable resistor VR6 connected in series with two padding resistors R27, R28 between the rails 50, 51. The base of the transistor Q4 is connected to the common point of two resistors R29, R30 connected in series between the terminal C and the rail 51. The output terminal of the amplifier A3 is connected by a variable resistor VR7 and a diode D3 in series to a point on a resistor chain R31, R32, R33 and VR8 between the rails 50, 51, which point is common to resistors R31 and R32. The common point of resistors R32, R33 is connected to the base of an n-p-n transistor Q6 connected as an emittter follower with its collector connected to the rail 50 via a resistor R18 and its emitter connected by the motoring pedal potentiometer 22 to the rail 51. The emitter of the transistor Q6 is also connected to a terminal F of FIG. 8. The voltage at the teminal is at a maximum level when the speed is zero at which point the output voltage of the amplifier A3 is higher than the voltage at the junction of resistors R31 and R32 determined by the setting of the variable resistor VR8. As the speed rises the output of the amplifier A3 falls until diode D3 starts to conduct which causes the voltage at F to fall linearly with rising speed. At a speed determined by the setting of the potentiometer VR6 the transistor Q4 will start to conduct and the current which it carries increases linearly with rising speed until the current which was previously carried by transistor Q5 is carried by transistor Q4 whereafter the transistor Q5 turns off. During this phase the output of the amplifier A3 remains constant, but once transistor Q5 has turned off the voltage at terminal F falls linearly again with rising speed.

The amplifier A4 has its non-inverting input terminal connected to the junction of the resistors R23, R24 by a resistor R34 and to the terminal C by a resistor R35. The inverting input terminal of the amplifier A4 is connected by a resistor R36 and a variable resistor VR9 in series, to the junction of resistors $R_{23}$, $R_{24}$. A feedback resistor R37 is connected between the inverting input terminal and the output terminal of the amplifier A4. The output terminal of the amplifier A4 is connected by a variable resistor VR10 and a diode D4 in series to the junction of two resistors R39, R40 connected in a chain with a resistor R41 and a variable resistor VR11 between the rails 50, 51. The output terminal of the amplifier A3 is connected to the same point by a variable resistor VR12 and a diode D5 in series. A transistor Q7 has its base connected to the junction of the resistors R40, R41 and its emitter connected by the brake pedal potentiometer 23 to the rail 51. The collector of the transistor Q7 is connected to the rail 50 via a resistor R34. The slider of the potentiometer 23 is connected to a terminal H. The output terminal of the amplifier A4 is connected to a terminal J. The voltage at the emitter of the transistor Q7 is zero when the speed is zero and then rises linearly until it reaches the level set by the variable resistor VR11. Thereafter the voltage follows that at the terminal F although the slope of the falling portions may be set differently by adjustment of the variable resistor VR12.

Turning now to FIG. 5 the circuit shown includes an operational amplifier A5 connected as a comparator with a resistor R42 connected between its output terminal and its non-inverting input terminal. The non-inverting and inverting input terminals of the amplifier A5 are connected to the terminals G and H respectively via resistor R250, R251, these terminals also being connected to the rail 51 by respective series circuits each consisting of a resistor R43, R44 and a capacitor C5, C6. The output terminal of the amplifier A5 is also connected to the rail 50 by a pair of resistors R45, R46 in series, to the rail 51 by a capacitor C7, and to a terminal L. The terminal J is connected to the base of a p-n-p transistor Q8 by a resistor R47, a resistor R48 connecting the base of transistor Q8 to the rail 50. The emitter of the transistor Q8 is connected by a resistor R49 to the collector of a p-n-p transistor Q9 the emitter of which is connected to the rail 50 and the base of which is connected to the junction of the resistors R45, R46. The collector of the transistor Q8 is connected to a terminal K, which is at a high signal level whenever the speed is below a predetermined level and the signal at terminal H is higher than that at terminal G (indicating that braking has been selected).

The resistors R43, R44 connect the terminals H, G to the bases of two transistors Q10, Q11, the emitters of which are connected by a common resistor R50 to the rail 51 and the collectors of which are connected by a common resistor R51 to the rail 50. The emitters of the transistors are connected to a terminal M, the signal at which is the armature current demand signal and follows the larger of the signals at G and H. The capacitors C5, C6 limit the rate at which the demand signal can vary following a step change at the positions of the pedals.

Turning now to FIG. 6, the terminal M is connected to the rail 51 by a capacitor C8 and to the non-inverting input terminal of an operational amplifier A6 by a resistor R52. The non-inverting input terminal of the amplifier A6 is connected to the rail 50 by a resistor R53 and a variable resistor VR13. The inverting input terminal of the amplifier A6 is connected by a resistor R54 to a terminal I from the armature current transducer 20 and to the rail 50 by a resistor R55. A capacitor C9 connects the terminal I to the rail 51. The output terminal of the amplifier A6 is connected to a terminal A and to the anode of a diode D6 and a feedback resistor R56 connects the cathode of the diode D6 to the inverting input terminal so that the amplifier A6 acts as the differential amplifier 19.

The cathode of the diode D6 is also connected by a resistor R57 to the inverting input terminal of an operational amplifier A7 acting as Schmidt bistable trigger circuit 18. Positive feedback around the amplifier A7 is provided by a resistor R58 in series with a variable resistor VR14 between the output terminal of amplifier A7 and its non-inverting input terminal, which is also connected by a resistor R59 to the rail 50. The output terminal of the amplifier A7 is connected by a capacitor C10 and two resistors R60 and R61 in series to the rail 51. A n-p-n transistor Q12 has its base connected to the junction of the resistors R60, R61 and its emitter connected to the rail 51. The collector of the transistor Q12 is connected by the two resistors R62, R63 in series to the rail 50 and a p-n-p transistor Q13 has its base connected to the junction of the resistors R62, R63 and its emitter connected to the rail 50. The collector of the transistor Q13 is connected by a resistor $R_{253}$ to rail 51 and by a resistor R64 to the non-inverting input terminal of the amplifier A7 to provide transient positive feedback to hasten switching of the amplifier A7 between its two states, and also to provide a minimum off time for the trigger circuit since the transient positive feedback does not disappear until the capacitor C10 stops charging following switching on of the Schmidt trigger. The output terminal of the amplifier A7 is connected by two resistors R65, R66 in series to the rail 50 and the junction of these resistors is connected to the base of a p-n-p transistor Q14 with its emitter connected to the rail 50.

The collector of the transistor Q14 is connected to the drive current 13 which is constituted by an input capacitor C11 connected to two resistors R67, R68 in series between the capacitor C11 and the rail 51. The junction of these resistors is connected to the base of an n-p-n transistor Q15 with its emitter connected to the rail 51 and its collector connected by two resistors R69, R70 in series to a 12 V rail 52. A p-n-p transistor Q16 has its base connected to the junction of the resistors R69, R70 with its emitter connected to the rail 52 and its collector connected by two resistors R71, R72 in series to the rail 51. A transistor Q17 has its base connected to the junction of the resistors R71, R72 and its emitter connected to the rail 52. The collector of the transistor Q17 is connected by a transformer primary winding 53 to the rail 52, a freewheel diode D7 being connected in series with a resistor R73 across this.

A pulse is produced in the secondary winding 54 of this transformer whenever the current feedback signal at the terminal I falls sufficiently far below the armature current demand signal at the terminal M to reverse the circuit around amplifier A7, thereby turning on the transistor Q14.

The drive circuits 14 and 15 are identical to the circuit 13 but are differently connected with the trigger circuit. In the case of the circuit 15 the input to the circuit is taken from the collector of the transistor Q13 so that a positive going pulse appears in the secondary winding of the transformer in circuit 15 whenever the transistor Q13 comes on, which occurs briefly when the current feedback signal at terminal I exceeds the demand signal at terminal M by a sufficient margin to return the trigger circuit around the amplifier A7 to its original condition.

The circuit 14 produces an output, a fixed delay after the circuit 15, and periodically whilst the transistor Q14 is switched off.

The fixed delay function is obtained by an operational amplifier A8 connected as a monostable circuit with a positive feedback resistor R74. The inverting input terminal of the amplifier A8 is connected by a capacitor C12 and a resistor R75 in series to the collector of the transistor Q13. A capacitor C13 is connected at one side to the rail 51 and at the other side by a resistor R76 to the inverting input terminal of the amplifier A8. A diode D8 has it anode connected to the output terminal of the amplifier A8 and its cathode connected to the junction of the resistor R76 and the capacitor C13. A resistor R77 connects the non-inverting input terminal of the amplifier A8 to the rail 50. The output terminal of the amplifier A8 is connected to the capacitor C14 of the circuit 14. When the transistor Q13 switches on as aforesaid, the output of the amplifier A8 goes low and capacitor C13 discharges slowly until the amplifier A8 switches to provide a high output which operates circuit 14.

The other form of operation of the circuit 14 is performed by an operational amplifier A9 connected as a voltage comparator. The collector of the transistor Q14 is connected by two resistors R78, R79 in series to the rail 51 and their junction is connected to the base of an n-p-n transistor Q18 with its emitter connected to rail 51 an its collecter connected by resistor R81 in series to the inverting input terminal of the amplifier A9. The non-inverting input terminal of the amplifier A9 is connected to its output terminal by a resistor R82 and to the rail 50 by a resistor R83. The output terminal of the amplifier A9 is connected by a resistor R84 to the junction of resistors R80 and R81 and by a pair of resistors R85, R86 in series to the rail 50. The base of a p-n-p transistor Q19 is connected to the jucntion of resistors R85, R86 and its emitter is connected to the rail 50. The collector of the transistor Q19 is connected to the rail 51 by a resistor R87 and, by a resistor R88, to a second input capacitor C15 of the circuit 14. A capacitor C16 is connected between the collector of the transistor Q18 and the rail 51. The resistor R82 provides immediate positive feedback around the amplifier A9 and the resistor R84 and capacitor C16 provide delayed feedback whenever the transistor Q18 is off.

Figure 7:
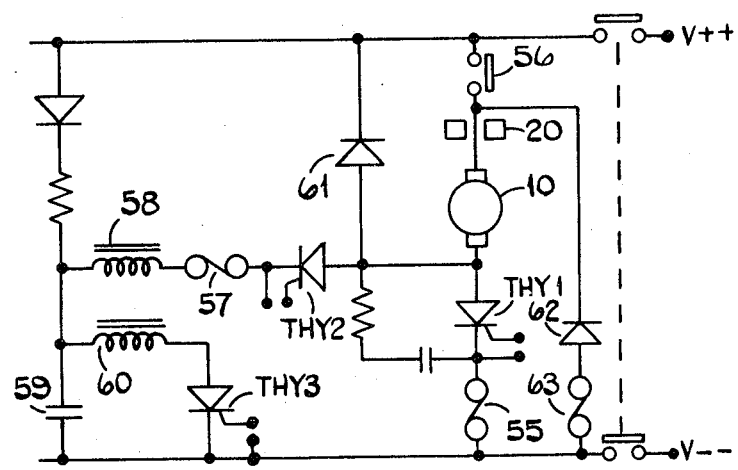

FIG. 7 shows the actual armature chopper circuit which includes three thyristors Th1, Th2 and Th3 controlled by the drive circuits 13, 14, and 15 respectively. The thyristor Th1 is connected between one side of the armature winding 10 and a fuse 55 (connected to a −supply rail), the other side of the winding 10 being connected by a contact 56 to a positive supply rail. The thyristor Th2 has its anode connected to the anode of the thyristor Th1 and its cathode connected by a fuse 57 an inductor 58 and a capacitor 59 in series to the −supply rail. The third thyristor Th3 has its cathode connected to the −supply rail and its anode connected by an inductor 60 to the junction of the inductor 58 and the capacitor 59. Said one side of the armature is connected via a diode 61 to the +rail and the other side is connected by a diode 62 and fuse 63 in series to the −rail.

When thyristor Th1 is fired current starts to flow through the armature. When thyristor Th2 is fired the armature current is diverted into the capacitor 59 which has previously been reversed charged so that the thyristor Th1 can switch off. Reverse charging of the capacitor 59 is achieved when the thyristor Th3 is fired.

Turning now to FIG. 8 terminal A of FIG. 6 is connected by a resistor R90 to the inverting input terminal of an operational amplifier A10 connected as a difference amplifier. Both the inverting and non-inverting input terminals of this amplifier A10 are connected by respective resistors R91 and R92 to the rail 50, the non-inverting input terminal being connected via a resistor R93 to the slider of a variable resistor VR15 connected between the rails 50, 51. The signal at terminal A is normally a triangular wave superimposed on a fixed d.c. level and the amplifier A10 is intended to detect when the voltage at A falls below a limit set by the variable resistor VR15 to indicate that too high an armature current is flowing during braking. The amplifier A10 has negative feedback provided by a resistor R94 between the output terminal of the amplifier A10 and its inverting input terminal.

The terminal A is also connected by a resistor R96 to the anode of a diode D9 with its cathode connected to the inverting input terminal of an amplifier A11 (also connected as a difference amplifier), by a resistor R97. A diode D10 has its anode connected to the output terminal of the amplifier A10 and its cathode connected to the cathode of the diode D9. Both of the inverting and non-inverting input terminals of the amplifier A11 are connected to the rail 50 by resistors R98 and R99 respectively. The non-inverting input terminal of the amplifier A11 is connected by a resistor R100 to the variable point of a variable resistor VR16 which corresponds to the potentiometer 40 of FIG. 1. The ripple rejection circuit 38 of FIG. 1 is constituted by a resistor R101 and a capacitor C17 connected in series between the cathodes of the diodes D9 and D10 and the non-inverting input terminal of the amplifier A11. Negative feedback around the amplifier A11 is provided by a resistor R102 connected between the output terminal of the amplifier A11 and the inverting input terminal thereof.

The start up circuit is constituted by a transistor Q20 with its collector connected to the anode of the diode D9 and its emitter connected to the rail 51. The transistor Q20 is biased off by a resistor R103 connected between its base and the rail 51 but can be turned on by a signal from the terminal B of the Schmidt bistable circuit (i.e. the output of amplifier A7). The terminal B is connected to the base of transistor Q20 by two resistors R104 and R105 in series with the common point of these resistors connected by a capacitor C19 to the rail 51. When the transistor C20 is conducting there can be no input from the terminal A to the amplifier A11.

The amplifier A11 is operative during forward motoring and compares the smoothed output of the amplifier A6 with the fixed voltage set on the variable resistor VR16. The signal at A decreases as the armature current increases because of the operation of the amplifier A6. Consequently the output of amplifier A11 is usually high, and decreases only when the average armature current fails to achieve the level demanded.

The amplifier A10 operates during braking and compares the signal at the terminal A with that set by the resistor VR15. The output of amplifier A10 goes high if the armature current exceeds the demand value by a predetermined amount set by the resistor VR15. When the output of the amplifier A10 is higher than the voltage at the terminal A the amplifier A10 will take over control of the amplifier A11 since the diodes D9 and D10 will operate as a highest wins gate.

The output terminal of the amplifier A11 is connected to the boost circuit 33, which is constituted by an amplifier A12 connected as a difference amplifier. To this end the amplifier A12 has its non-inverting input terminal connected to the terminal M (from FIG. 5) via two resistors R106, R107 in series. The inverting input terminal of the amplifier A12 is connected via a resistor R108 and a variable resistor VR17 in series to a terminal N which is at the junction of the resistors R23 and R24 in FIG. 4. A resistor R109 is connected between the output terminal of the amplifier A12 and its inverting input terminal.

The amplifier A12 operates to provide a high output signal whenever the armature current demand signal M exceeds a level determined by the setting of the resistor VR17. This high output is used to boost the field current as will be explained hereinafter.

The output terminal of the amplifier A11 is connected via the resistors R110 and R111 in series to the rail 50, the common point of these resistors being connected via a capacitor C20 to the rail 50 and being also connected to the base of a p-n-p transistor Q21. The emitter of the transistor Q21 is connected to the rail 50 via a diode D11 and its collector is connected by a resistor R112 to the inverting input terminal of the amplifier A12. Thus when the output of the amplifier A11 falls as it does during the two conditions mentioned above the transistor Q21 will turn on and the non-inverting input terminal of the amplifier A12 will then effectively be connected to the rail 50 by the resistor R112 so that the output of the amplifier A12 will go low.

The interconnection of the resistors R106 and R107 is connected to the collector of a n-p-n transistor Q22 the emitter of which is connected to the rail 51. The base of the transistor Q22 is connected to the common point of two resistors R113 and R114 connected between the terminal C of FIG. 3 and the rail 51. The transistor Q22 turns on when the speed is above a predetermined level so that the signal from the terminal M via the resistor R106 is grounded and the output of the amplifier A12 goes low.

The output of the amplifier A12 is connected by a variable resistor VR18 and a diode D12 to the junction of two resistors R115 and R116. The other end of the resistor R115 is connected via a resistor R117 to the rail 50 and to the junction of the resistors R115 and R117 there is connected a resistor R118 connected to the output terminal of the amplifier A11. The opposite end of the resistor R116 is connected by a resistor R119 and a variable resistor VR19 in series to the rail 51. Connected to the junction of the resistors R116 and R119 is the output terminal of an operational amplifier A13, such output terminal also being connected to the rail 51 by a resistor R120 and a capacitor C21 in series. The inverting input terminal of the amplifier A13 is connected by a resistor R121 to its output terminal and by a resistor R122 to the terminal F of FIG. 4. The non-inverting input terminal of the amplifier A13 is connected by a resistor R123 to the terminal K of FIG. 5, by a resistor R124 to the terminal D of FIG. 3 and by a resistor R125 to the rail 50.

The output terminal of the amplifier A13 is connected via a resistor R126 to the base of a transistor Q23. The collector of this transistor is connected by a resistor R127 to the rail 50 and its emitter is connected by a resistor R128 to the rail 51. The base of a transistor Q24 is connected to the common point of two resistors R301 and R302 connected in series with a further resistor R303 between the rails 50 and 51. The common point of the resistors R301 and R303 is connected by a diode D31 to a terminal Q and is also connected by a diode D30 (both diodes D30, D31 having their anodes connected to this common point) to the collector of a transistor Q26 which has its emitter connected to the rail 51 and its base connected by a resistor R132 to the anode of a diode D13 (which has its cathode connected to the rail 51) such anode being connected by a resistor R131 to the rail 50. The base of the transistor Q26 is also connected to terminal G and H (FIG. 4) by resistors R133 and R134 respectively. The collector of the transistor Q26 is also connected by a resistor R129 and a zener diode ZD3 in series to the base of a pnp transistor Q25 which base is also connected to the rail 50 by a resistor R130. The emitter of the transistor Q25 is connected to the rail 50 and its collector is connected to a terminal R. The collector of the transistor Q24 is connected to the base of the transistor Q23 and also to a terminal S.

Transistor Q26 is turned on when either of the braking or motoring pedals is depressed and current passed by the resistor R303 thus flows through the transistor Q26 and prevents transistor Q24 from being turned on. When transistor Q26 is not turned on, however, the transistor Q24 turns on and grounds the base of the transistor Q23 so that the field current demand signal from the amplifier A13 is not passed forward in the circuit.

FIG. 8 also shows the field current differential amplifier 30 of FIG. 1 which is constituted by an operational amplifier A14 with a resistor R140 and a capacitor C22 providing negative feedback between its output terminal and its inverting input terminal. Both input terminals of the amplifier A14 are connected to the rail 51 by resistors R141 and R142 respectively and the inverting input terminal is connected to the output terminal of the field current transducer 32, by a resistor R143. The non-inverting input terminal of the amplifier A14 is connected to the emitter of the transistor Q23 by a resistor R144.

The amplifier A15 shown in FIG. 8 is the Schmidt bistable circuit 28 of FIG. 1. This consists of a resistor R145 which connects the inverting input terminal of the amplifier A15 to the output terminal of the amplifier A14, a resistor R146 which connects the non-inverting input terminal of the amplifier A15 to the rail 50 and two resistors R147 and R148 in series between the output terminal of the amplifier A15 and its non-inverting input terminal, with a capacitor C23 connected across the resistor R147. The output terminal of the amplifier A15 is connected to a terminal P shown in FIG. 9.

Figure 9:
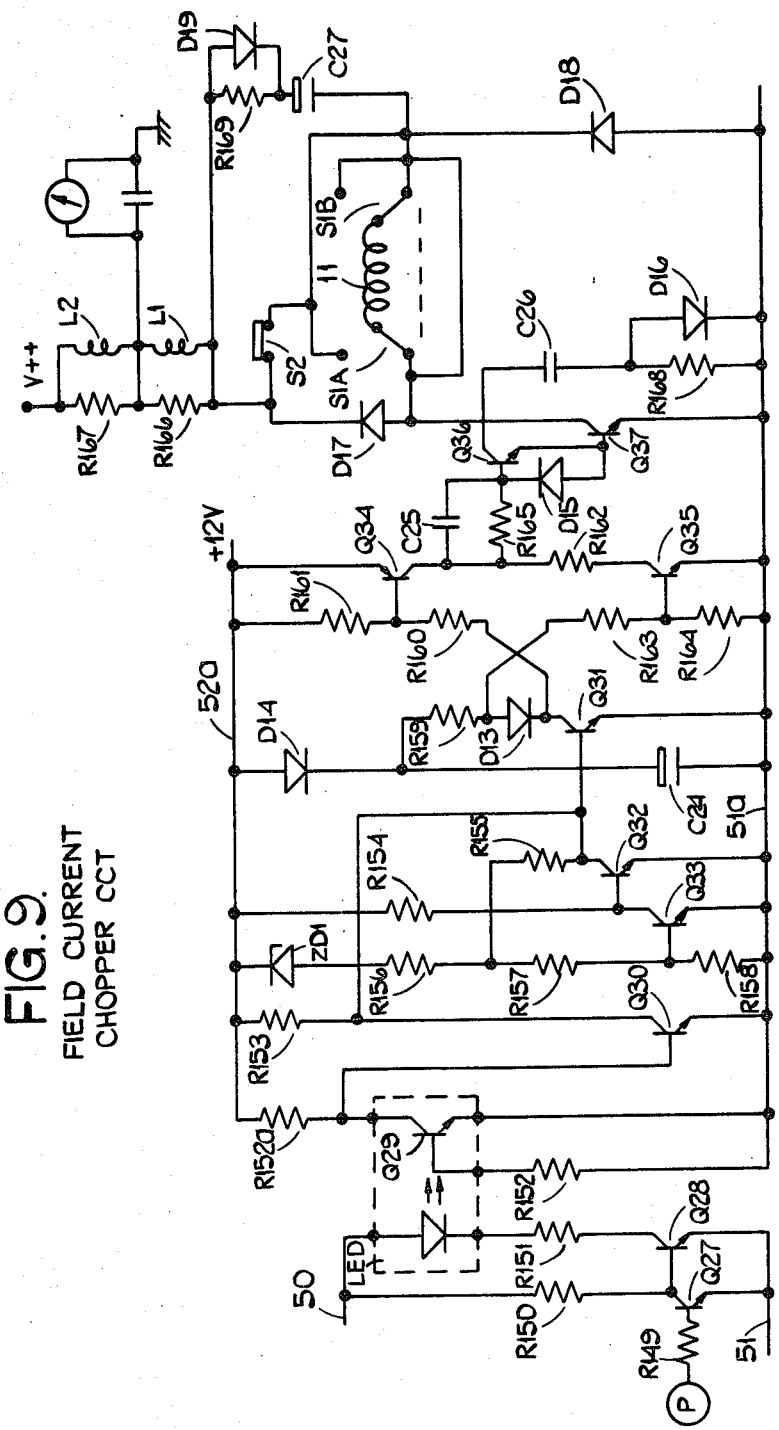

In FIG. 9 the terminal P is shown connected by a resistor R149 to the base of an n-p-n transistor Q27 with its emitter grounded to the rail 51 and its collector connected to the rail 50 by a resistor R150. The collector of the transistor Q27 is connected to the base of a transistor Q28 with its emitter connected to rail 51 and its collector connected via a resistor R151 to the cathode of a light emitting diode LED of the opto-isolator 27. The anode of the diode LED is connected to the rail 50. The base of the light sensitive transistor Q29 of the opto-isolator 27 is connected by a resistor R152 to the isolated earth rail 51a. The emitter of the transistor Q29 is connected directly to the rail 51a and its collector is connected via a resistor R152a to the 12V rail 52a. The collector of the transistor Q29 is also connected to the base of a n-p-n transistor Q30 with its emitter connected to the rail 51a and its collector connected to rail 52a by a resistor R153. The collector of the transistor Q30 is connected to the base of a transistor Q31 which is also connected to the collector of a transistor Q32 with its emitter connected to the rail 51a and its base connected to the collector of a transistor Q33 which has its emitter connected to the rail 51a. The collector of the transistor Q33 is connected by a resistor R154 to the rail 52a and the collector of the transistor Q32 is connected via a resistor R155 to the common point of two series resistors R156 and R157. The opposite end of the resistor R156 is connected to the anode of a zener diode ZD1 the cathode of which is connected to the rail 52a. The opposite end of the resistor R157 is connected via a further resistor R158 to the rail 51a the common point of these two resistors being connected to the base of the transistor Q33.

The emitter of the transistor Q31 is connected to the rail 51a and its collector is connected to the cathode of a diode D13 with its anode connected via a resistor R159 to the cathode of a diode D14 with its anode connected to the rail 52a. The cathode of the diode D14 is connected to one side of a capacitor C24 the other side of which is connected to the rail 51a. The collector of the transistor Q31 is also connected via two resistors R160 and R161 in series to the rail 52a, the common point of these resistors being connected to the base of a p-n-p transistor Q34 with its emitter connected to the rail 52a and its collector connected via a resistor R162 to the collector of a n-p-n transistor Q35 which has its emitter connected to the rail 51a. The base of the transistor Q35 is connected to the common point of two resistors R163 and R164 connected in series between the rail 51a and the anode of the diode D13.

The signal at the terminal P rises when the field current is too high and falls when the field current is too low. The portion of FIG. 9 thus far described isolates the control circuit of FIG. 8 from the high voltage field chopper circuit of FIG. 9 and provides conversion to push-pull operation.

The collector of the transistor Q34 is connected by a resistor R165 and a capacitor C25 in parallel to the base of a drive transistor Q36 the emitter of which is connected to the base of a power transistor Q37 with its emitter connected to the rail 51a. A diode D15 is connected between the emitter and base of the transistor Q36. The collectors of the two transistors Q36 and Q37 are connected together and to two contacts of a two-pole two-way switch S1A, and S1B. The common contact of the two poles of the switch S1A, S1B are interconnected by the field winding 11 and the remaining contacts are connected together and via a switch S2, to a high voltage supply rail. This rail is connected to the positive terminal of the main traction battery via two inductors L1 and L2 in series, each inductor being bridged by a low value resistors R166, R167. A capacitor C26 connects the collectors of the transistors Q36 and Q37 to the anode of a diode D16 the cathode of which is earthed to the rail 51a. A resistor R168 is connected across the diode D16. A power diode D17 has its anode connected to the collectors of the transistors Q36 and Q37 and its cathode connected to the high voltage supply rail. A further power diode D18 has its cathode connected to one contact of the switch S2 and its anode connected to the rail 51a. A capacitor C27 has one side connected to the anode of the diode D18 and the other side connected to the cathode of a diode D19 which has its anode connected to the high voltage supply rail. A resistor R169 bridges this diode D19.

As will be explained in more detail hereinafter the switches S1 and S2 determine the mode in which the motor runs. In the position of the switches shown the field winding is connected for forward running, the diode D17 acting as a recirculating diode. When the switch S2 is changed to its alternative position (which can only occur when the transistors Q36 and Q37 are not conducting) e.m.f. induced in the winding 11 goes to charge the battery and this causes the flux in the winding to decay quickly. The switch S1 is only operated when the current is at a suitably low value and when the switch S2 is changed from the position shown to provide either electrical braking or reverse running.

Figure 10:
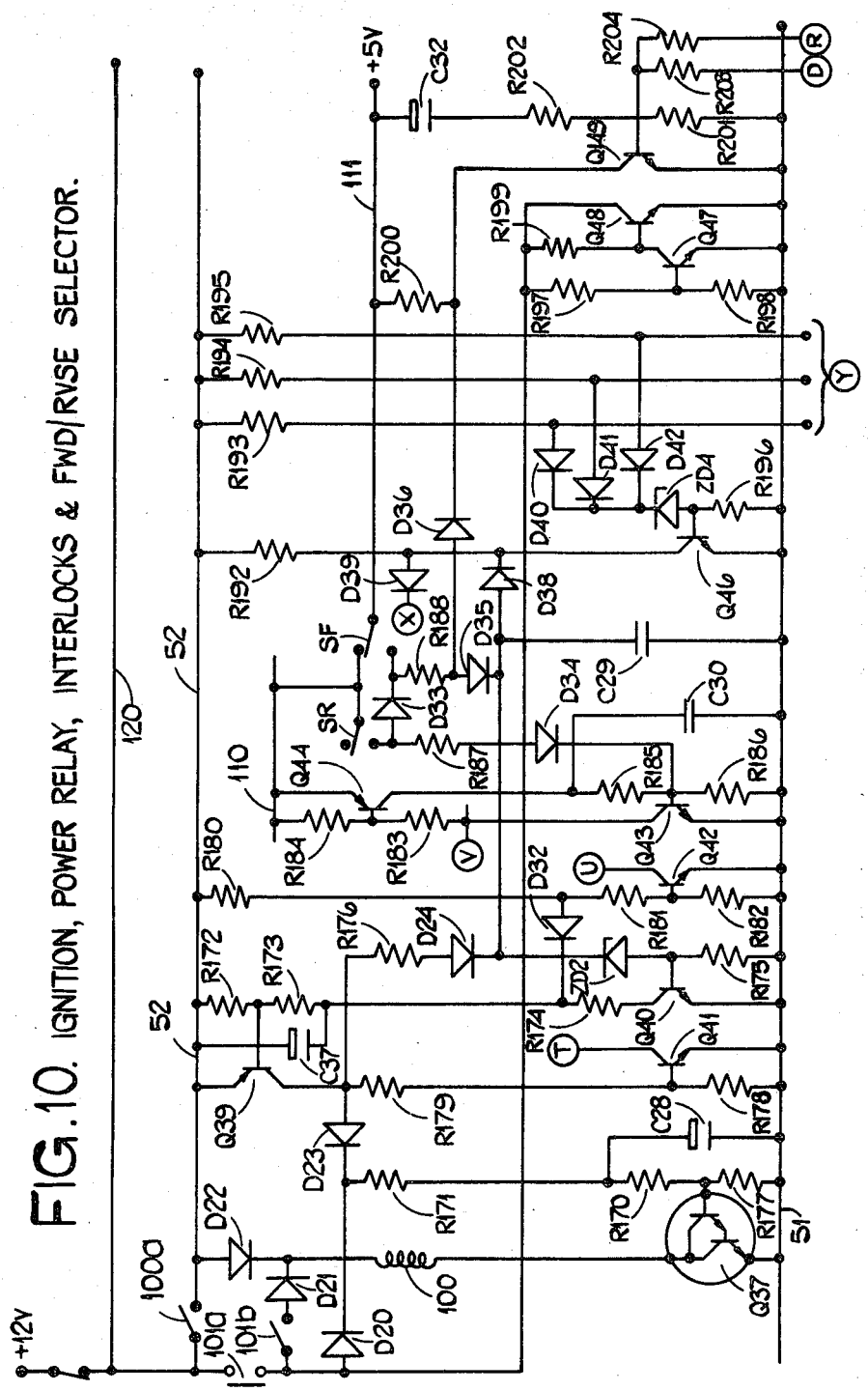
FIGS. 10 and 11 show portions of FIG. 2 in more detail.

Turning now to FIG. 2 the circuits shown operate primarily to protect the motor and control circuit against improper operation by providing various interlocks. The supply of power to the whole control circuit is determined primarily by power relay circuit 100 controlled by an ignition switch 101. An interlock circuit 102 ensures that the relay winding 103 controlling the switch S2, the relay winding 104 controlling the switches S1A and S1B and the contactor 105 controlling the contact 56 in FIG. 7 cannot be operated unless certain conditions to be described hereinafter are satisfied. These conditions are that interlocks operated by plugs on the current transducers 20 and 32 and the speed transducer 9 are properly engaged. The field force relay is controlled by a field force logic circuit 106 which also controls a series of demand clamps 107 as will be explained hereinafter to short to earth the signals from the brake and accelerator pedal potentiometers and also to prevent operation of the Schmidt trigger 17. The relay 104 is controlled by forward/reverse logic circuit 108 and the brake contactor is controlled by a motor/brake logic circuit 109. Turning now to FIG. 10, the ignition switch has one set of contacts 101a which are closed when the key of the switch is turned to its on position. Turning the key further against a spring load (like a normal vehicle ignition switch) closes a start contact 101b. The contact 101b is connected to the anode of a diode D21 the cathode of which is connected through the relay 100 to the collector of a Darlington pair Q38 with its emitter grounded to the rail 51. The base of the Darlington pair Q38 is connected via two resistors R170 and R171 in series to the cathode of the diode D20. The relay contact 100a connects the 12V input terminal to the rail 52 and a diode D22 has its anode connected to rail 52 and its cathode connected to the cathode of the diode D21. The cathode of a diode D20 (which has its anode connected to the contact 101a) is connected to the cathode of diode D23 with its anode connected to the collector of a p-n-p transistor Q39 having its emitter connected to the rail 52. The base of the transistor Q39 is connected to the rail 52 by a resistor R172 and also by a resistor R173 and a resistor R174 in series to the collector of an n-p-n transistor Q40. The junction of resistors R173, R174 is connected by a capacitor C37 to the rail 52. The emitter of the transistor Q40 is connected to the rail 51 and its base is connected by a resistor R175 to the rail 51 and also to the anode of a zener diode ZD2. The cathode of the zener diode ZD2 is connected to the cathode of a diode D24 the anode of which is connected by a resistor R176 to the anode of the diode D23. The base of the Darlington pair Q38 is connected to the rail 51 by a resistor R177 and the junction of the resistors R170 and R171 is connected to the same rail by a capacitor C28.

An n-p-n transistor Q41 has its emitter connected to the rail 51 and its base connected to the junction of two resistors R178 and R179 which are connected in series between the rail 51 and the collector of the transistor Q39. The collector of the transistor Q41 is connected to a terminal T which is connected to power the main battery isolator relay shown in FIG. 7.

A diode D32 has its cathode connected to the junction of the resistors R174 and R173. Its anode is connected to the junction of two resistors R180, R181 which are connected in series with a further resistor R182 between the rails 52 and 51. The junction of the resistors R181 and R182 is connected to the base of an n-p-n transistor Q42 which has its emitter grounded to the rail 51 and its collector connected to a terminal U, (see FIG. 11). An npn transistor Q43 has its emitter connected to the rail 51 and its collector connected by two resistors R183, R184 in series to a sub-rail 110 and a terminal V is also connected to the collector of the transistor Q43. The base of the transistor Q43 is connected to the common point of two resistors R185, R186 connected in series between the collector of a pnp transistor Q44 and the rail 51. The emitter of the transistor Q44 is connected to the sub-rail 110 and its base is connected to the common point of the resistors R183, R184.

The connection of the sub-rail 110 to a +5 V supply rail 111 is controlled by a pair of push button switches SF and SR which are intended to be pressed by the driver of the vehicle to select forward or reverse drive conditions. Both switches are of the single pole two-way type and the common contact of the switch SF is connected to the rail 111. The normally closed contact of the switch SF is connected to the sub-rail 110 and to the common contact of the switch SR. The normally open contact of the switch SF is connected to the cathode of a diode D33, the anode of which is connected to the normally open contact of the switch SR. A resistor R187 connects the normally open contact of the switch SR to the anode of a diode D34 which has its cathode connected to the base of the transistor Q43. The normally open contact of the switch SF is also connected by a resistor R188 to the anode of two diodes D35 and D36. Diode D35 has its cathode connected to the cathode of the zener diode ZD2 and also, by a capacitor C29, to the rail 51.

The collector of the transistor $Q_{44}$ is connected by a capacitor $C_{30}$ to the rail 51.

The cathode of the diode $D_{35}$ is connected to the anode of a diode $D_{38}$ the cathode of which is connected by a resistor $R_{192}$ and by a diode $D_{39}$ to a terminal X. A group of further terminals Y are each connected by associated resistor $R_{193}$, $R_{194}$ and $R_{195}$ to the rail 52 and also by associated diodes $D_{40}$, $D_{41}$, $D_{42}$ to the cathode of a zener diode $ZD_4$, the anode of which is connected to the base of an npn transistor $Q_{46}$ and by a resistor $R_{196}$ to the rail 51. The terminals X, and Y are all associated with various interlock switches. For example the terminal X is grounded if a battery charger is plugged into a charging socket on the vehicle. The terminals Y are grounded when connections to the speed and current transducer are properly made.

The anode of the diode $D_{20}$ is also connected by two resistors $R_{197}$ and $R_{198}$ to the rail 51 with the common point of these resistors connected to the base of an npn transistor $Q_{47}$. The emitter of the transistor $Q_{47}$ is connected to the rail 51 and its collector is connected to the base of an npn transistor $Q_{48}$ and also by a resistor $R_{199}$ to the cathode of the diode $D_{38}$. The emitter of the transistor $Q_{48}$ is connected to the rail 51 and its collector is connected to the cathode of the diode $D_{38}$.

A further npn transistor $Q_{49}$ has its emitter connected to the rail 51 and its collector connected by a resistor $R_{200}$ to the rail 111, and also connected to the cathode of the diode $D_{36}$. The base of the transistor $Q_{44}$ is connected by a resistor $R_{201}$ to the rail 51 and by a resistor $R_{202}$ and a capacitor $C_{32}$ in series to the rail 111. A resistor $R_{203}$ connects the base of the transistor $Q_{49}$ to the terminal D (see FIG. 3) and a resistor $R_{204}$ connects the base of the transistor $Q_{49}$ to the terminal R (see FIG. 8).

Figure 11:
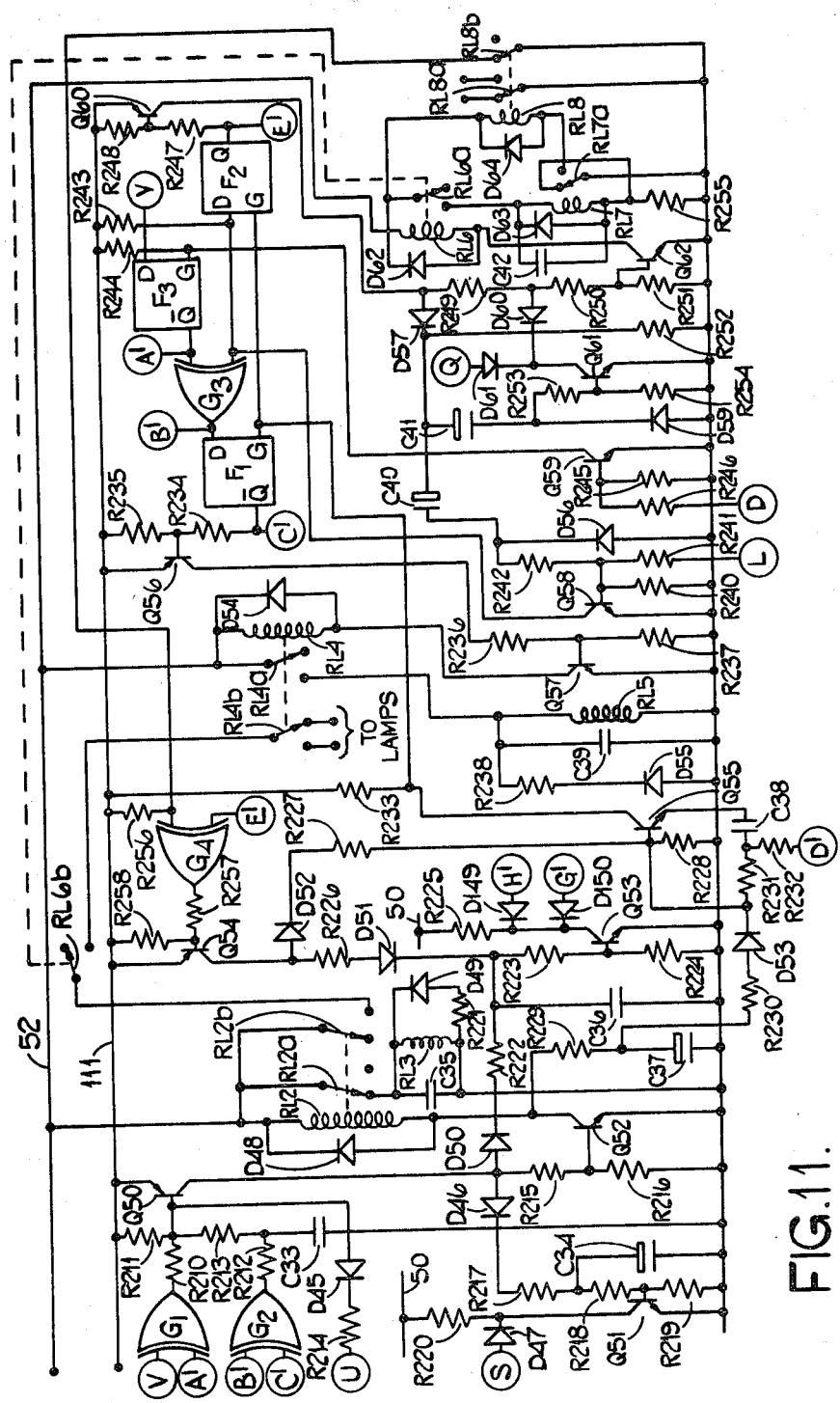

Turning now to FIG. 11, the circuit shown includes two exclusive OR gates $G_1$ and $G_2$ of which the gate $G_1$ has one input terminal connected to the terminal V (FIG. 10) and its other input terminal connected to a terminal A' (to be referred to hereinafter). The input terminals of the gate $G_2$ are connected to terminals B' and C' (also to be referred to hereinafter). The output terminal of the gate $G_1$ is connected by a resistor $R_{210}$ to the base of a pnp transistor $Q_{50}$ with its emitter connected to the rail 111 and a bias resistor $R_{211}$ connecting its base to the rail 111. A pair of resistors $R_{212}$, $R_{213}$ in series connect the output terminal of the gate $G_2$ to the base of the transistor $Q_{50}$, a capacitor $C_{33}$ connecting the common point of the resistor $R_{212}$, $R_{213}$ to the rail 51. A resistor $R_{214}$ and diode $D_{45}$ in series connect the base of the transistor $Q_{50}$ to the terminal U, (FIG. 10). The collector of the transistor $Q_{50}$ is connected by two resistors $R_{215}$, $R_{216}$ in series to the rail 51.

The anode of a diode $D_{46}$ is also connected to the collector of the transistor $Q_{50}$ and its cathode is connected by three resistors $R_{217}$, $R_{218}$ and $R_{219}$ in series to the rail 51, a capacitor $C_{34}$ being connected between the junction of the resistors $R_{217}$ and $R_{218}$ and the rail 51. The junction of the resistors $R_{218}$ and $R_{219}$ is connected to the base of an n.p.n transistor $Q_{51}$ the emitter of which is connected to the rail 51 and the collector of which is connected by a resistor $R_{220}$ to the rail 50 and by a diode $D_{47}$ to the terminal S (FIG. 8).

The common point of the resistors $R_{215}$, $R_{216}$ is connected to the base of an n.p.n. transistor $Q_{52}$. The emitter of the transistor $Q_{52}$ is connected to the rail 51 and its collector is connected via a relay winding RL2 to the 12 V rail 52, a diode $D_{48}$ bridging the relay winding RL2.

The winding RL2 operates two two-way contacts RL2a and RL2b. The contact RL2a normally connects a relay winding RL3 between the rails 51, 52, but this connection is broken when the winding RL2 is energised, the winding RL3 when energised holding the contact $S_2$ (FIG. 9) closed. A capacitor $C_{35}$ bridges the winding RL3, and a diode $D_{49}$ and a resistor $R_{221}$ in series also bridge the winding RL3.

A diode $D_{50}$ has its anode connected to the collector of the transistor $Q_{50}$, its anode being connected to the rail 51, by three resistors $R_{222}$, $R_{223}$ and $R_{224}$ in series with a capacitor $C_{36}$ connected between the junction of resistors $R_{222}$ and $R_{223}$ and the rail 51. An npn transistor $Q_{53}$ has its base connected to the junction of the resistors $R_{223}$ and $R_{224}$ and its emitter connected to the rail 51. The collector of the transistor $Q_{53}$ is connected by a resistor $R_{225}$ to the rail 50 and by two diodes $D_{149}$ and $D_{150}$ to the terminals H' and G' (FIG. 5). A pnp transistor $Q_{54}$ has its emitter connected to the rail 111 and its collector connected by a resistor $R_{226}$ and a diode $D_{51}$ in series to the junction of the resistors $R_{222}$ and $R_{223}$. The circuit controlling the base of the transistor $Q_{54}$ will be explained in greater detail hereinafter.

The collector of the transistor $Q_{54}$ is also connected by a diode $D_{52}$ and two resistors $R_{227}$ and $R_{228}$ in series to the rail 51. The base of an npn transistor $Q_{55}$ is connected to the junction of the resistors $R_{227}$ and $R_{228}$. The collector of the transistor $Q_{52}$ is connected by a resistor $R_{229}$ to one side of a capacitor $C_{37}$, the other side of which is connected to the rail 51. Said one side of the capacitor $C_{37}$ is connected by a diode $D_{53}$ and a resistor $R_{230}$ in series to the base of the transistor $Q_{55}$. A terminal D' at which there is a positive voltage whenever an armature or field current is flowing (via a current detector circuit which is not shown) is connected by two resistors $R_{231}$, $R_{232}$ in series to the base of the transistor $Q_{55}$. The emitter of the transistor $Q_{55}$ is connected to the rail 51 and its collector is connected by a load resistor $R_{233}$ to the rail 111 and also to the G inputs terminals of two flip-flop circuits $F_1$ and $F_2$ which are both parts of a standard SN 7475 TTL integrated circuit. The $\overline{Q}$ output of the flip-flop circuit $F_1$ is connected to the terminal C' and is also connected by two resistors $R_{234}$ and $R_{235}$ in series to the rail 111. A pnp transistor $Q_{56}$ has its base connected to the junction of these resistors $R_{234}$ and $R_{235}$ and its emitter connected to the rail 111. The collector of the transistor $Q_{56}$ is connected by two resistors $R_{236}$, $R_{237}$ in series to the rail 51, the junction of these resistors being connected to the base of an npn transistor $Q_{57}$ having its emitter to the rail 51 and its collector connected by a relay winding RL4 and a recirculating diode $D_{54}$ in parallel to the rail 52. The relay RL4 has two sets of two way contacts RL4a and RL4b the contacts RL4a controlling the connection of a relay winding RL5 which controls the switches S1A and S1B in FIG. 9. The relay winding RL5 is bridged by two parallel paths consisting respectively of a capacitor $C_{39}$ and of a resistor $R_{238}$ and a diode $D_{55}$ in series.

An exclusive OR gate G3 has its output terminal connected to the B' terminal and also to the D input terminal of the flip-flop circuit $F_1$. The gate G3 has one input terminal connected to the $\overline{Q}$ output terminal of a further flip-flop circuit $F_3$ (which output terminal is also connected to the terminal A') and its other input terminal connected to the collector of an npn transistor $Q_{58}$ the emitter of which is connected to the rail 51. The base of the transistor $Q_{58}$ is connected by a resistor $R_{240}$ to the rail 51, by a resistor $R_{241}$ to the terminal L (see FIG. 5) and by a resistor $R_{242}$ to one side of a capacitor $C_{40}$, the junction of the resistor $R_{242}$ and the capacitor $C_{40}$ being connected to the cathode of a diode $D_{56}$, the anode of which is connected to the rail 51.

The flip-flop circuit $F_2$ has its D input terminal connected to the collector of the transistor $Q_{58}$ and also, by a resistor $R_{243}$ to the rail 111. The flip-flop circuit $F_3$ has its D input terminal connected to the terminal V (see FIG. 10) and its G input terminal connected by a resistor $R_{244}$ to the rail 111 and also directly to the collector of an npn transistor $Q_{59}$. The emitter of transistor $Q_{59}$ is connected to the rail 51 and its base is connected by a resistor $R_{245}$ to the rail 51 and by a resistor $R_{246}$ to the terminal D (see FIG. 3). The Q output terminal of the flip-flop circuit $F_2$ is connected to a terminal E' and also by two resistors $R_{247}$, $R_{248}$ in series to the rail 111. The common point of the resistors $R_{247}$, $R_{248}$ is connected to the base of a pnp transistor $Q_{60}$ which has its emitter connected to the rail 111. The collector of the transistor $Q_{60}$ is connected by three resistors $R_{249}$, $R_{250}$ and $R_{251}$ in series to the rail 51. The collector of the transistor $Q_{60}$ is also connected to the anode of a diode $D_{57}$ having its cathode connected to the other side of the capacitor $C_{40}$ and also having its cathode connected by a resistor $R_{252}$ to the rail 51. The cathode of the diode $D_{57}$ is also connected to one side of a capacitor $C_{41}$, the other side of which is connected by two resistors $R_{253}$, $R_{254}$ in series to the rail 51, a diode $D_{59}$ being connected across the resistors $R_{253}$ and $R_{254}$. An npn transistor $Q_{61}$ has its base connected to the junction of the resistors $R_{253}$ and $R_{254}$ and its emitter connected to the rail 51. The collector of the transistor $Q_{61}$ is connected by a diode $D_{61}$ to the terminal Q (see FIG. 8). A diode $D_{60}$ has its cathode connected to the collector of the transistor $Q_{61}$ and its anode connected to the junction of the resistors $R_{249}$ and $R_{250}$.

The base of an npn transistor $Q_{62}$ which has its emitter connected to the rail 51 and a relay winding RL6 connected between its collector and the rail 52. A recirculating diode $D_{62}$ is connected across the winding RL6 which has two sets of two way contacts RL6a and RL6b. The contacts RL6b are in a series circuit with the contacts RL2b and RL4b to light one of two signal lamps (according to the state of relay RL4) when relay RL2 is de-energised and relay RL6 energised.

The contacts RL6a control current flow in a contactor winding RL7 which controls the contact 56 of the armature chopper circuit (FIG. 7) through an auxiliary contact RL7a of the contactor RL7. The contact RL7a is a change-over contact with a common terminal connected to the rail 51 and a resistor $R_{255}$ connecting its 'normally closed' terminal to the rail 51. This 'normally closed' terminal is connected via the winding RL7 to the contacts RL6a which are normally open. A diode $D_{63}$ and a capacitor $C_{42}$ are connected in parallel across the winding RL7.

The 'Normally open' terminal of the contact RL7a is connected by a relay winding RL8 to the rail 52, a diode $D_{64}$ bridging the winding RL8. The relay RL8 has two two-way contacts RL8a and RL8b. The contacts RL8a is connected to short either the base of the transistor $Q_{10}$ or the base of the transistor $Q_{11}$ (FIG. 5) to the rail 51 and the contacts RL8b normally connect the rail 51 to one input terminal of a further exclusive OR gate G4 controlling the transistor $Q_{54}$. This input terminal is also connected to the rail 111 by a resistor $R_{256}$. The other input terminal of the gate G4 is connected to the terminal E' (i.e. the Q output of the flip-flop F2). The output terminal of the gate G4 is connected by two resistors $R_{257}$ and $R_{258}$ in series to the rail 111, the common point of these resistors being connected to the base of the transistor $Q_{54}$.

When the "ignition" switch is moved to its normal on position the Darlington transistor $Q_{38}$ receives base current via the diode $D_{20}$ and the resistors $R_{170}$ and $R_{171}$. In addition the transistors $Q_{47}$ is turned on via the resistors $R_{197}$. Moving the "ignition" switch to the start position enable the relay 100 to pull in through the diode $D_{21}$ and this causes power to be supplied to the rest of the circuit and also causes relay 100 to latch via the diode $D_{22}$.

When one of the switches SF or SR is pressed, the transistor $Q_{40}$ turns on via the resistor $R_{188}$ and the diodes $D_{35}$ and $ZD_2$. This turns on the transistor $Q_{39}$ via the resistors $R_{173}$ and $R_{174}$ and the capacitor $C_{37}$ across the resistors $R_{172}$ and $R_{173}$ charges. The transistor $Q_{39}$ and $Q_{40}$ forms a latch arrangement such that when the transistor $Q_{39}$ turns on the transistor $Q_{40}$ is held on via the resistor $R_{176}$ and the diode $D_{24}$. This also turns on the transistor $Q_{41}$ via the resistor $R_{179}$ so as to supply power to a relay controlling a main isolator for the armature chopper circuit which now becomes live.

This start up sequence only occurs if certain conditions are satisfied and various safety interlocks are provided. The transistor $Q_{46}$ must be off so that the terminals Y must all be grounded. If this is not so the cathode of the diode $D_{38}$ is held low through transistor $Q_{46}$ and the transistor $Q_{40}$ is unable to turn on when one of the switches SF, SR is actuated. There is also a further interlock comprising the transistor $Q_{44}$ and the diode $D_{36}$. At switch on the upper side of capacitor $C_{32}$ goes to 5 V and the transistor $Q_{44}$ therefore turns on for a short time holding the anode of the diode $D_{35}$ low so that pressing of either switch SF or SR again has no effect until the transistor $Q_{44}$ turns off. This delay of approximately 250 mS is intended to prevent the main isolators closing until after the other sections of the circuit have settled in their correct operating states. The transistor $Q_{44}$ can also be turned on by signals from the terminals D and R to prevent the isolators closing if the vehicle is moving when switched on or if a demand on the accelerator is present.

At this stage the shut down sequence can also be partially understood. When the ignition switch is opened, the transistor $Q_{47}$ turns off and the transistor $Q_{48}$ turns on removing base drive from the transistor $Q_{40}$ which turns off. The capacitor $C_{37}$ then discharges through the resistor $R_{173}$ and after a 200 mS delay the transistor $Q_{39}$ turns off. This makes the transistor $Q_{41}$ turn off, causing the main isolators to open. After another short delay, during which the capacitor $C_{28}$ is discharging, the transistor $Q_{38}$ turns off removing the power supply from all the circuits.

It is to be noted that if one of the interlock terminals Y is removed from ground whilst the system is in use or if the cathode of the diode $D_{39}$ is grounded (which occurs when the charger plug is inserted) the main isolators open but the power to the various other circuits is not interrupted.

When one of the selector switches SR, SF is actuated the latch constituted by the transistors $Q_{43}$ and $Q_{44}$ assumes its appropriate state, ie off for forward and on for reverse.

The signal from the latch circuit $Q_{43}$, $Q_{44}$ is applied via the terminal V to the gate G1 and the flip-flop circuit $F_3$. If at this time, the signal at terminal D is low (indicating that the vehicle is stationary), the transistor $Q_{59}$ is off and the G input of the flip-flop circuit $F_3$ is thus high. The flip-flop circuit $F_3$ can thus change to the required state. The $\overline{Q}$ output of the flip-flop circuit $F_3$ is compared by the gate $G_3$ with the signal from the transistor $Q_{58}$ (which is determined by whether the motoring or brake mode is currently in demanded as indicated by the signal at terminal L from FIG. 5). The output of the flip-flop circuit $F_3$ provides a normal or reverse field signal in the appropriate sense for forward and reverse, motoring or braking as set out in the following table:

The sequence which occurs when a change is made from reverse to forward motoring is similar to that described above and will not be described in detail.

In some circumstance there may be a current flowing in the field winding which is too small to be reliably detected by the current transducer and which, therefore, does not cause the signal at the terminal D' to go high. Such current may, however, be sufficient to damage the relay RL5 if broken repeatedly and an arrangement is therefore included to ensure that field forcing occurs even when there is no high signal at the terminal D' and a current direction change has been demanded.

| Operating mode | G1 & F3 V | F3 Q | G3 $Q58^c$ | G3 B' | F1 Q | Field current direction | Reverse Relay RL5 |
|---|---|---|---|---|---|---|---|
| Forward motoring | high | low | low | low | high | Normal | Non-energised |
| Forward braking | high | low | high | high | low | Reversed | Energised |
| Reverse motoring | low | high | low | high | low | Reversed | Energised |
| Reverse braking | low | high | high | low | high | Normal | Non-energised |

This arrangement gives the required field current direction for each operating mode, the flip-flop F1 controlling the relay RL5 via the transistors $Q_{56}$ and $Q_{57}$ and the relay RL4.

The circuit ensures that the field forcing relay RL3 is always operated when any change of mode requiring field reversal is demanded, so that the reversing relay RL5 is never called upon to break the field current.

The sequence when changing from forward to reverse is as follows: When the transistor $Q_{43}$ turns on the D input to the flip-flop circuit $F_3$ goes low and assuming the vehicle is stationary, the signal at the G input of the flip-flop circuit $F_3$ is high so that the $\overline{Q}$ output of flip-flop circuit $F_3$ goes high and causes the D input to circuit $F_1$ to go high. However, if current is flowing in the armature or field winding terminal D' will be high and transistor $Q_{55}$ will be held on thereby so that the G input of circuit $F_1$ is low and circuit $F_1$ cannot change state. This "out of phase" condition is detected by the gate $G_2$ and its output goes low, thus turning on the transistor $Q_{50}$. This, in turn, turns on the transistor $Q_{51}$ via the diode $D_{46}$ and the resistors $R_{217}$ and $R_{218}$ so that the field current demand signal at the terminal S is clamped to zero via the diode $D_{47}$. In addition the transistor $Q_{52}$ turns on via the resistor $R_{215}$ and energises the relay RL2 which in de-energises the relay RL3 causing the contact $S_2$ to open thereby causing rapid decay of the current in the field winding.

The transistor $Q_{50}$ also turns on the transistor $Q_{53}$ via the diode $D_{50}$ and the resistors $R_{222}$ and $R_{223}$. Transistor $Q_{53}$ clamps the armature current demand to zero via the diodes $D_{149}$ and $D_{150}$ and the terminals H' and G'. This ensures that the armature current also decays, through the contact 56 and the recirculating diode (FIG. 7).

When both the armature current and the field current have disappeared the signal at the terminal D' will go low, the transistor $Q_{55}$ will switch off and the G input to the circuit $F_1$ will go high enabling the circuit $F_1$ to change state causing the relay RL5 to be energised via the transistors $Q_{56}$, $Q_{57}$ and the relay RL4. The output of the gate $G_2$ now goes high, switching off the transistors $Q_{50}$ and $Q_{52}$ and thereby re-energising the relay RL3. The field current demand clamp is released after a delay determined by the capacitor $C_{34}$ and the armature demand clamp is released after a delay determined by the capacitor $C_{36}$.

This function is provided by virtue of the connection between transistors $Q_{52}$ and $Q_{55}$ via the resistors $R_{229}$ and $R_{230}$ and the diode $D_{53}$, so that the transistor $Q_{55}$ is on whenever transistor $Q_{52}$ is off independently of the current signal at terminal D'. The effect of this is to prevent the circuit $F_1$ from changing state until field forcing has occurred and the transistor $Q_{52}$ turns on. There is then a delay (e.g. 75 mS) whilst the capacitor $C_{37}$ discharges before the transistor $Q_{55}$ can turn off and circuit $F_1$ can change.

Field forcing also occurs whenever the control circuit is switched on or shut down. When the relay 100 is pulled in, the transistor $Q_{42}$ is turned on via the resistors $R_{180}$ $R_{181}$ and thus turns on the transistor $Q_{50}$ via the terminal U, the resistor $R_{214}$ and the diode $D_{45}$. This field forcing and demand clamping occur as described above. When one of the buttons is pressed the transistor $Q_{40}$ turns on causing the transistor $Q_{42}$ to turn off (via the diode $D_{32}$). Transistor $Q_{50}$ thus turns off, forcing is released and the demand clamps are released after their appropriate delays.

During shut-down transistor $Q_{40}$ turns off before the relay 100 opens so that the transistor $Q_{42}$ comes on again, causing forcing and demand clamping until shut down is completed.

The change from motoring to braking is similar to the change from forward to reverse. In motoring the signal at terminal L is high so that the transistor $Q_{58}$ is on and the Q output of circuit $F_2$ is low. When the signal at terminal L goes low the transistor $Q_{58}$ turns off and its collector goes high. This causes field forcing and reversal as in the case of the forward reverse change-over with circuit $F_1$ changing state when transistor $Q_{55}$ finally goes off. At that time circuit $F_2$ also changes state so that the transistor $Q_{60}$ goes off. Because there is an operating delay in the contactor RL7, the gate $G_4$ detects the change at the Q output of the circuit $F_1$ since the other gate input is driven by the relay RL8 dependent on operation of the contactor.

When the gate $G_4$ detects the change at the Q output of the circuit $F_2$, its output goes low and holds the transistor $Q_{43}$ on, via the transistor $Q_{54}$, the resistor $R_{226}$ and the diode $D_{51}$, until the motor/brake contactor RL7 has changed to the braking position and the other input to gate $G_4$ has changed. The demand clamps are then released and the motor is in the braking mode.

A further safety interlock is provided which prevents a fault current being broken by the contactor RL7. To this end when the transistor $Q_{54}$ turns on, the transistor $Q_{55}$ is held on via the diode $D_{52}$ and the resistor $R_{227}$. This prevents the flip-flop circuit $F_1$ and $F_2$ changing back until braking mode has been achieved and the transistor $Q_{54}$ is turned off.

In the change-over from braking to motoring special problems arise because of residual magnetism in the motor. The field current must be reversed and reset in the motoring direction before the brake contactor RL7 closes to its motoring position.

The sequence of events is as follows: When the signal at the terminal L goes high to indicate that motoring is demanded the signal at the collector of the transistor $Q_{58}$ goes high. The field reversal process takes place as before, and circuit $F_2$ changes state at the same time as circuit $F_1$. The transistor $Q_{60}$ turns on so that the signal at its collector goes high. This positive going edge is transmitted through the diode $D_{57}$, the capacitor $C_{41}$ and the resistor $R_{253}$ to turn on the transistor $Q_{61}$ which holds off the transistor $Q_{62}$ via the diode $D_{60}$. Since the transistor $Q_{62}$ cannot turn on, the contactor RL7 stays in the braking condition until the capacitor $C_{41}$ charges up and the transistor $Q_{61}$ turns off again. During this delay the field current can reverse and reset its magnetic circuit, the reset pulse being achieved by holding off the field demand clamp via diode $D_{61}$ and terminal Q (see FIG. 8). During the delay the output of gate G4 is low, so that the transistor $Q_{53}$ is on and the armature demands are clamped, this clamping being removed when the contactor changes and $Q_{53}$ turns off after a delay determined by the discharge of capacitor $C_{36}$. To ensure that the field reset pulse always occurs the motoring signal at transistor $Q_{58}$ must be of approximately the same duration as the hold off delay on the contactor RL7. This is achieved by another C-R network $C_{40}$ and $R_{242}$ to the base of the transistor $Q_{58}$ from the collector of the transistor $Q_{60}$ via the diode $D_{57}$. This delay is made very slightly longer than that brought about by capacitor $C_{41}$ and resistor $R_{253}$ to ensure that quick changes from motoring to braking do not upset the operation of the field reset circuit. When braking is selected immediately after going into the motoring mode, the delay capacitors $C_{40}$ and $C_{41}$ must be able to discharge quickly ready for the next change to motoring. This is achieved via the diodes $D_{56}$ and $D_{59}$ and the resistor $R_{252}$ (which is of low ohmic value). The diode $D_{57}$ prevents the voltages on capacitors $C_{40}$ and $C_{41}$ from reaching the base of the transistor $Q_{62}$ and turning it on after the transistor $Q_{60}$ has turned off.

The gate $G_1$ causes field forcing and demand clamping if reverse mode is selected by pressing the push button SR when the vehicle is already in forward motion, i.e. when the transistor $Q_{59}$ is on and the G input of the circuit $F_3$ is low. Normal change-over will occur when the speed signal at terminal D goes low and circuit $F_3$ changes followed by circuit $F_2$ as before. The same sequence occurs if push-button SF is pressed whilst the vehicle is in motion backwards. This interlock prevents reversing at speed and protects the chopper and motor drive components from consequent damage.

I claim:

1. A control circuit for an electric vehicle traction motor having separate armature and field windings, comprising an armature winding current control, a braking contact which is in series with the armature winding and which is closed or opened according to whether motoring or braking is required, an alternative path being provided for current generated by the motor during braking, reversing switch means connected in circuit with the field winding, a field current control and logic circuit means arranged to operate during a change from braking mode to motoring mode so as sequentially to reverse said reversing switch means when the field current is below a predetermined level, commence field current flow in the required direction for motoring mode and then close the brake contact whereby any residual magnetism in the field structure is reversed before the brake contact is closed.

2. A control circuit as claimed in claim 1 in which the field current control includes a field current demand signal generating circuit, an actual field current signal generating circuit, a difference amplifier connected to said generating circuits to provide a control signal for a field current switching circuit, a clamping circuit connected to the output of the demand signal generating circuit and also connected to the logic circuit so as to clamp the output of the demand signal generating circuit to zero under the control of said logic circuit and clamping circuit override means connected to said clamping circuit and to said logic circuit and arranged to prevent operation of said clamping circuit when it is required to commence field current flow.

3. A control circuit as claimed in claim 2 in which the braking contact is operated by a relay connected to be driven by the logic circuit, said logic circuit including a delay circuit arranged to delay operation of said relay during change-over from braking to motoring after the production of a signal in the logic circuit following reduction of the field current to less than said predetermined value, said delay circuit being connected to said clamping circuit override means so that the clamping circuit is disabled for the duration of the delay period of said delay circuit.

* * * * *